United States Patent
Hall et al.

(10) Patent No.: US 10,274,315 B2
(45) Date of Patent: Apr. 30, 2019

(54) THREE-WHEELED VEHICLE ALIGNMENT RACK SYSTEM

(71) Applicants: David R. Hall, Provo, UT (US);
Stephen R. Hall, Draper, UT (US);
Christopher Johnson, Provo, UT (US);
Jason Simpson, Provo, UT (US);
Jedediah Knight, Provo, UT (US)

(72) Inventors: David R. Hall, Provo, UT (US);
Stephen R. Hall, Draper, UT (US);
Christopher Johnson, Provo, UT (US);
Jason Simpson, Provo, UT (US);
Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/347,095

(22) Filed: Nov. 9, 2016

(65) Prior Publication Data
US 2018/0128605 A1 May 10, 2018

(51) Int. Cl.
*G01B 11/275* (2006.01)
*B62D 17/00* (2006.01)

(52) U.S. Cl.
CPC ........... *G01B 11/275* (2013.01); *B62D 17/00* (2013.01)

(58) Field of Classification Search
CPC ........... B29D 30/26; B29D 2030/0066; B29D 30/2607; B29D 30/3007; H04N 7/18; B65H 26/00; G01B 11/272
USPC .................................. 356/401–426, 634, 244
See application file for complete search history.

(56) References Cited

U.S. PATENT DOCUMENTS

| | | | | |
|---|---|---|---|---|
| 4,130,362 A | * | 12/1978 | Lill | G01B 11/26 33/288 |
| 4,455,759 A | * | 6/1984 | Coetsier | G01B 11/2755 33/203.14 |
| 5,488,471 A | * | 1/1996 | McClenahan | G01B 11/2755 33/203.15 |
| 2004/0165174 A1 | * | 8/2004 | Knoedler | G01B 11/275 356/4.01 |
| 2017/0158241 A1 | * | 6/2017 | Prusinowski | B62D 17/00 |

* cited by examiner

*Primary Examiner* — Isiaka O Akanbi

(57) ABSTRACT

A vehicle wheel alignment rack is described herein that includes at least one laser and a target. The laser is removably coupled to a wheel of a vehicle. The target corresponds to the laser and is disposed at an opposite end of the vehicle from the laser. The target is directly and removably coupled to a frame of the vehicle such that the target is aligned with the frame at a known angle. The wheel is aligned to the frame by comparing the known angle to an expected and actual position on the target where a beam of light from the laser strikes the target. Some embodiments of the claimed invention include at least a second laser and a second target similarly disposed. Various means of coupling the target or targets to the frame are also disclosed herein.

20 Claims, 18 Drawing Sheets

THREE-WHEELED VEHICLE ALIGNMENT RACK SYSTEM

TECHNICAL FIELD

This invention relates generally to vehicle alignment, especially for three-wheeled vehicles.

BACKGROUND

Three-wheeled roadsters, such as those manufactured by Vanderhall Motor Works or Polaris Industries, represent an emerging market of recreational street vehicles with potentially explosive growth in the coming years. With such growth, solutions will be needed to maintain these cutting-edge recreational vehicles. Current solutions are inadequate for these vehicles because such solutions are designed primarily for four wheeled vehicles. One such area that needs be addressed is in wheel alignment for three wheeled vehicles. Current commercial systems are simply incapable, based on their design and functionality, of aligning most three wheeled vehicles because they require aligning for tires to each other. Clearly, because three wheeled vehicles do not have four wheels, these solutions are difficult to adapt. The primary problem in aligning the wheels on a three wheeled vehicle is determining what to align the wheels to. Thus there is significant room for innovation and improvement in this technical field.

SUMMARY OF THE INVENTION

In general, a vehicle wheel alignment rack is described herein that addresses many of the issues described above. The alignment rack includes lasers coupled to wheels at one end of the vehicle and targets coupled to the vehicle frame at the opposite end of the vehicle. The wheels are aligned to the frame. Thus, one of skill in the art would recognize that in order for the wheels to be true, and for the vehicle to drive properly, it is crucial that the vehicle frame be true. In other words, one component of a method for aligning the wheels of a three wheeled vehicle includes ensuring proper alignment of the vehicle frame, and then aligning the wheels to the frame.

One of skill in the art will readily recognize the benefits and advantages of the claimed invention, and how the claimed invention addresses current issues in the technical field. For example, the current system addresses the incompatibility of four wheeled vehicle alignment racks with three wheeled vehicles. The apparatus described herein also helps maintenance shops lower costs associated with providing alignment services because the claimed invention can be used to align three wheeled vehicles, four wheeled vehicles, and even motorcycles, provided that the alignment of the frame of such vehicles is known. The claimed alignment rack is also significantly more compact without sacrificing efficiency compared to many current commercial systems.

With specific regard to one embodiment of the claimed invention, a vehicle wheel alignment rack is described herein that includes at least one laser and a target. The laser is removably coupled to a wheel of a vehicle. The target corresponds to the laser and is disposed at an opposite end of the vehicle from the laser. The target is directly and removably coupled to a frame of the vehicle such that the target is aligned with the frame at a known angle. The wheel is aligned to the frame by comparing the known angle to an expected and actual position on the target where a beam of light from the laser strikes the target. Some embodiments of the claimed invention include at least a second laser and a second target similarly disposed. Various means of coupling the target or targets to the frame are also disclosed herein.

Some embodiments of the claimed invention include an articulating base positioned beneath the wheel. The articulating base enables alignment of the wheel without having to lift the wheel off the ground. Various mechanisms, sensors, and electronics are also described that aid in automatic, hands-free, and instantaneous wheel alignment.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

Figure 1A:
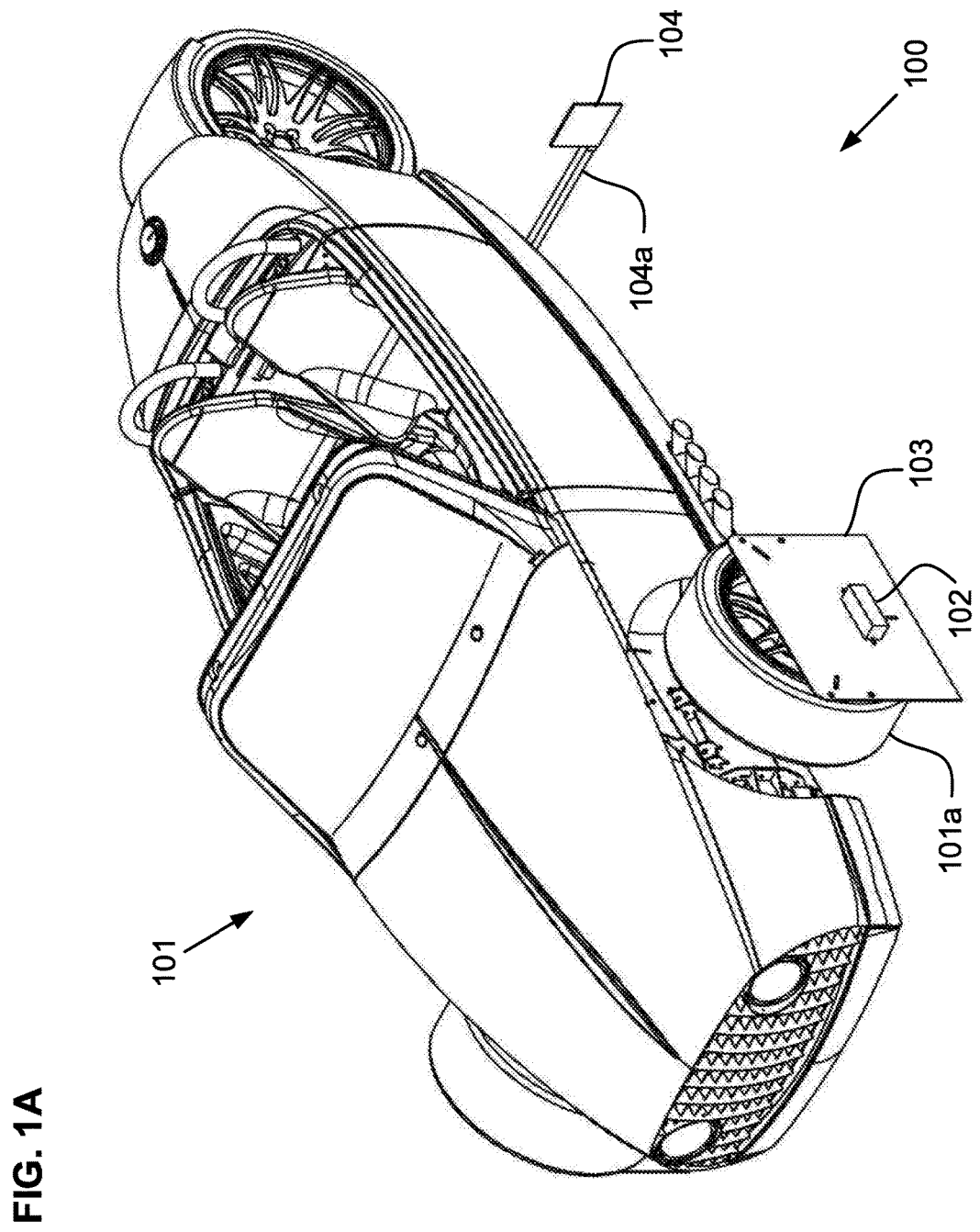
FIGS. 1A-D depict various views of an alignment rack, according to the claimed invention, affixed to a three wheeled vehicle.
Figure 1B:
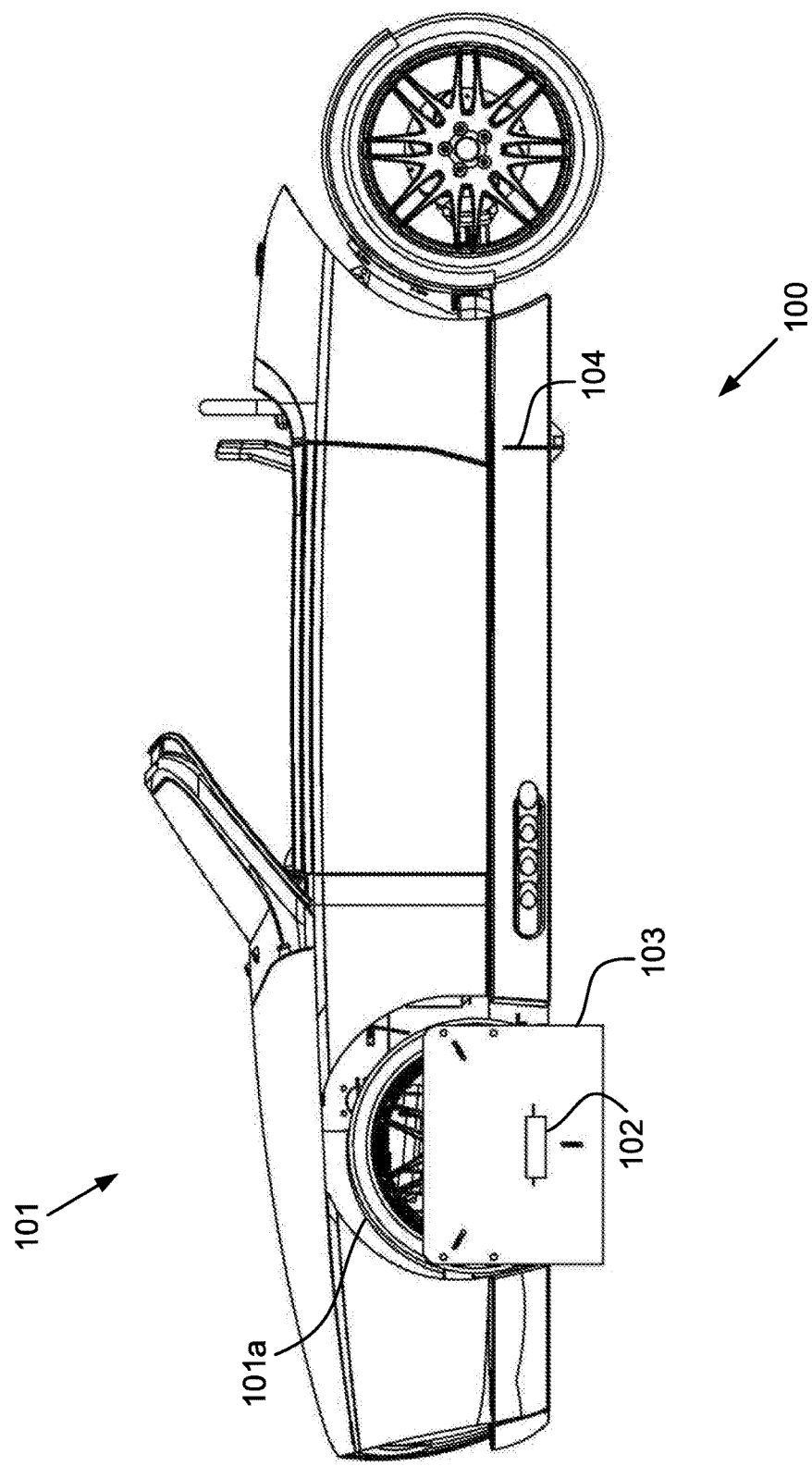

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

Throughout the detailed description, various elements are described as "off-the-shelf." As used herein, "off-the-shelf" means "pre-manufactured" and/or "pre-assembled."

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

FIGS. 1 A-D depict various views of an alignment rack, according to the claimed invention, affixed to a three wheeled vehicle. The three wheeled vehicle depicted is a Vanderhall Motor Works Laguna, the use of the claimed vehicle alignment rack is not limited to the particularly depicted vehicle or brand of vehicle. System 100 includes vehicle 101, laser 102, mounting plate 103, and target 104. As depicted, laser 102 is removably coupled to wheel 101a by mounting plate 103. In some embodiments, laser 102 is permanently affixed to mounting plate 103, and mounting plate 103 is removably affixed to wheel 101a, examples of which are described in more detail below regarding FIGS. 7A-B. In other embodiments, laser 102 is removably coupled to mounting plate 103. Target 104 corresponds to laser 102 by intercepting a beam of light emitted from laser 102 and indicating to a user the alignment of wheel 101a with respect to the frame of vehicle 101. Target 104 is disposed at an opposite end of vehicle 101 from laser 102. Additionally, in various embodiments target 104 is directly and removably coupled to the frame of vehicle 101 such that target 104 is aligned with the frame at a known angle. In this way, wheel 101a can be, and in many cases is, aligned to the frame of vehicle 101.

As mentioned briefly above, though vehicle 101 is depicted as a particular model of the three-wheeled vehicle, in various other embodiments of the claimed invention vehicle 101 includes a variety of different wheeled vehicles. For example, in some embodiments, vehicle 101 includes two front wheels and one rear wheel, whereas in other embodiments vehicle 101 includes one front wheel and two rear wheels. In some embodiments, vehicle 101 is a two wheeled vehicle, such as a motorcycle. In other embodiments, vehicle 101 is a four wheeled vehicle.

Laser 102 is, in various embodiments, any of a variety of off-the-shelf lasers. In general, laser 102 includes lasers that emit one or more wavelengths of light having a high degree of spatial coherence. As used herein, spatial coherence refers to the width of a beam emitted by laser 102 relative to the irradiance of the laser. For example, various embodiments of laser 102 include lasers having power ratings ranging from less than 1 mW up to approximately 1 W, and a beam with ranging from less than a millimeter to several millimeters. In some embodiments, laser 102 emits visible light. In other embodiments, laser 102 emits one or more nonvisible wavelengths. In such embodiments, target 104 includes a photosensitive surface facing laser 102 that communicates with one or more hardware processors. The hardware processors receive signals from this photosensitive surface indicating a location on target 104 where a beam of light from laser 102 strikes target 104. Such an embodiment is described below in more detail regarding FIG. 12.

Embodiments of mounting plate 103 include various features. For example, various embodiments of mounting plate 103 are constructed such that, as mounting plate 103 is coupled to wheel 101a, mounting plate 103 contacts a forward portion and an aft portion of wheel 101a. This helps to ensure that laser 102 is aligned parallel to the outside face of wheel 101a. Thus, in many embodiments, mounting plate 103 is constructed of one or more materials that resist bending and warping from various conditions, such as varying atmospheric temperatures and humidity, or from rough and/or improper care of mounting plate 103. For example, in one embodiment, mounting plate 103 is constructed of laser cut aluminum. In another embodiment, mounting plate 103 is constructed of a hardened and/or thermoset plastic, such as ABS plastic. Yet other embodiments, mounting plate 103 is constructed of steel.

In the depicted embodiment, target 104 is a square sheet of aluminum. Target 104 is coupled to vehicle 101 by beam 104a. Various embodiments of target 104 and beam 104a are described below in more detail with regard to FIGS. 2-8.

Wheel 101a includes any of a variety of standard automotive wheels sufficient for use on the corresponding vehicle 101. However, in some embodiments, wheel 101a is specialized to include various features that make it easier to attach laser 102 wheel 101a. For example, in some embodiments, wheel 101a includes one or more permanent magnets. In such embodiments, mounting plate 103 includes one or more corresponding magnetic surfaces, including permanent magnets and/or ferromagnets, that affixed mounting plate 103 to wheel 101a. The permanent magnets on or in wheel 101a are outward facing so that mounting plate 103 magnetically mounts to wheel 101a.

Figure 1C:
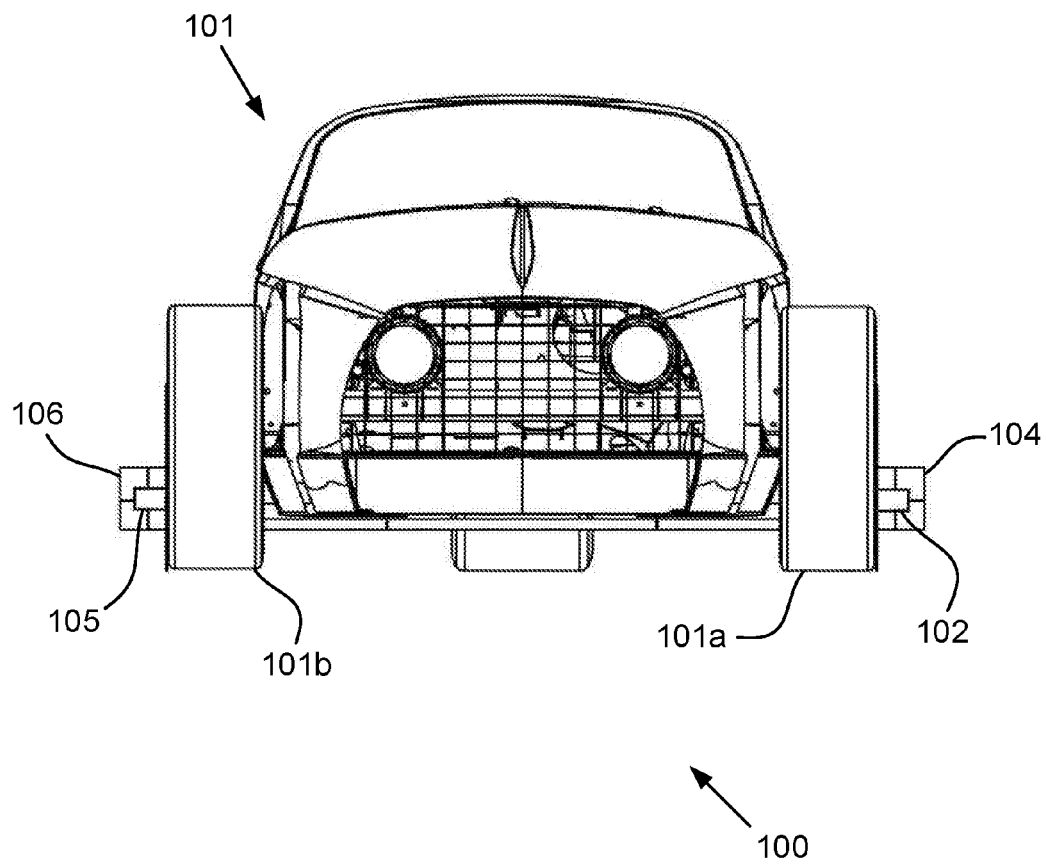
Figure 1D:
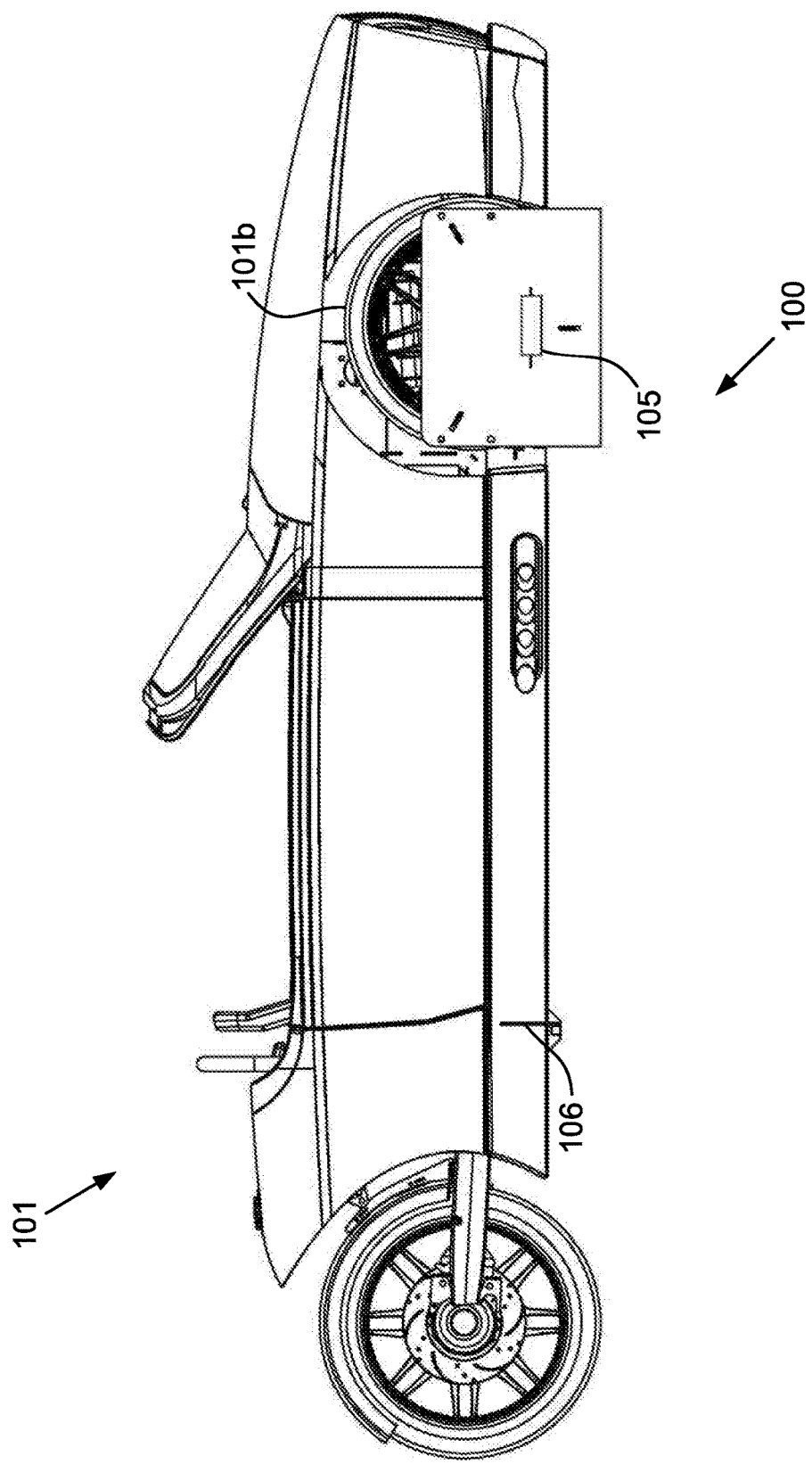

As shown in FIG. 1C, in some embodiments, system 100 includes at least a second laser, laser 105, and a second target, target 106. Similar to laser 102, laser 105 is removably coupled to wheel 101b, where wheel 101b is disposed at an opposite side of vehicle 101 from wheel 101a. Target 106 corresponds to laser 105, and is disposed at an opposite end of vehicle 101 from laser 105, and at an opposite side of vehicle 101 from target 104.

Figure 2:
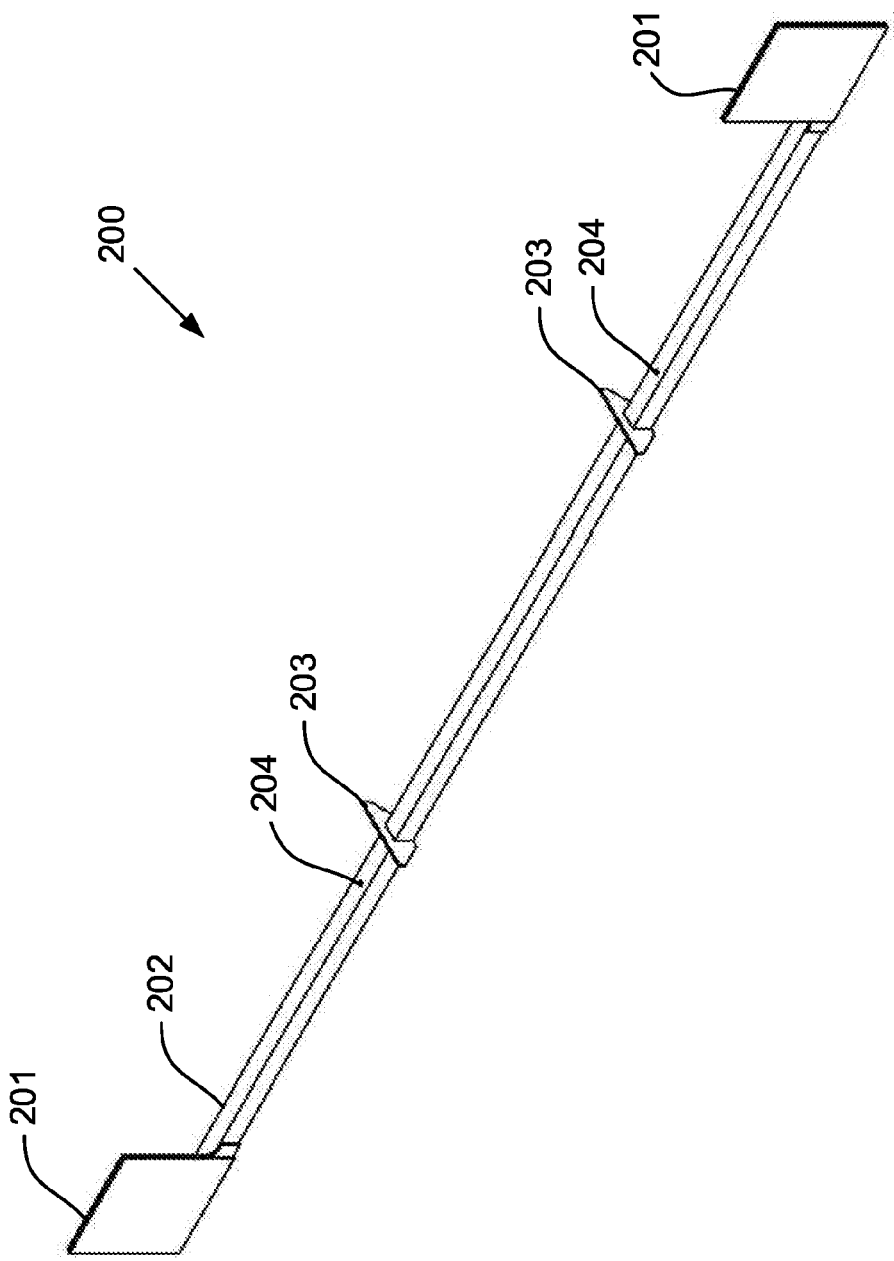
FIG. 2 depicts one embodiment of a set of targets for use with an alignment rack according to the claimed invention.

FIG. 2 depicts one embodiment of a set of targets for use with an alignment rack according to the claimed invention. Target assembly 200 includes targets 201, beam 202, mounting tabs 203, and openings 204. As shown, targets 201 are coupled to each other via beam 202. Beam 202 couples targets 201 to a vehicle frame in any of a variety of ways. For example, as depicted in FIGS. 1 A-D, in some embodiments, beam 202 passes beneath the vehicle. In other embodiments, beam 202 passes behind the vehicle, such as by coupling to a rear bumper and/or a rear fender. In yet other embodiments, beam 202 passes through the vehicle, such as bypassing between a rear wheel and the vehicle frame, or bypassing through the vehicle frame and body panels.

Beam 202 is, in various embodiments, comprised of any of a variety of sturdy materials. In general, beam 202 is resistant to bending and/or warping similar to mounting plate 103 described above. For example, in one embodiment, beam 202 is comprised of aluminum. In another embodiment, beam 202 is comprised of steel. In yet another embodiment, beam 202 is comprised of ABS plastic. Targets 201 mount to beam 202 in any of a variety of ways. For example, in some embodiments, beam 202 and targets 201 are both comprised of metals. In some such embodiments, targets 201 are welded to beam 202. One benefit of this is to ensure that targets 201 remain properly aligned with beam 202 to prevent erroneous wheel alignment. Alternatively, in some embodiments, targets 201 and beam 202 are comprised of different materials, such as one being comprised of a metal, and the other being comprised of plastic. In such embodiments, it is particularly beneficial for each target 201 to be secured to beam 202 at several locations. This similarly helps ensure proper beam-target alignment.

Mounting tabs 203 and openings 204 provide means, either independently or collectively, for mounting beam 202 to a vehicle frame. For example, in the depicted embodiment, slots in a bottom panel of a unibody vehicle frame receive mounting tabs 203, thereby mounting beam 202 directly to the frame. The bottom panel also includes threaded circular openings corresponding to openings 204. As such, beam 202 is bolted to the frame through openings 204 by threaded bolts. Mounting tabs 203 ensure that beam 202 is precisely aligned at a known angle along the bottom panel of the vehicle frame. Although in many embodiments, this known angle is 90°, it is not necessarily essential that the angle between the frame and beam 202 be 90°. Thus, in various embodiments, the angle between beam 202 and the vehicle frame ranges from 45 to 90°.

Figure 3:
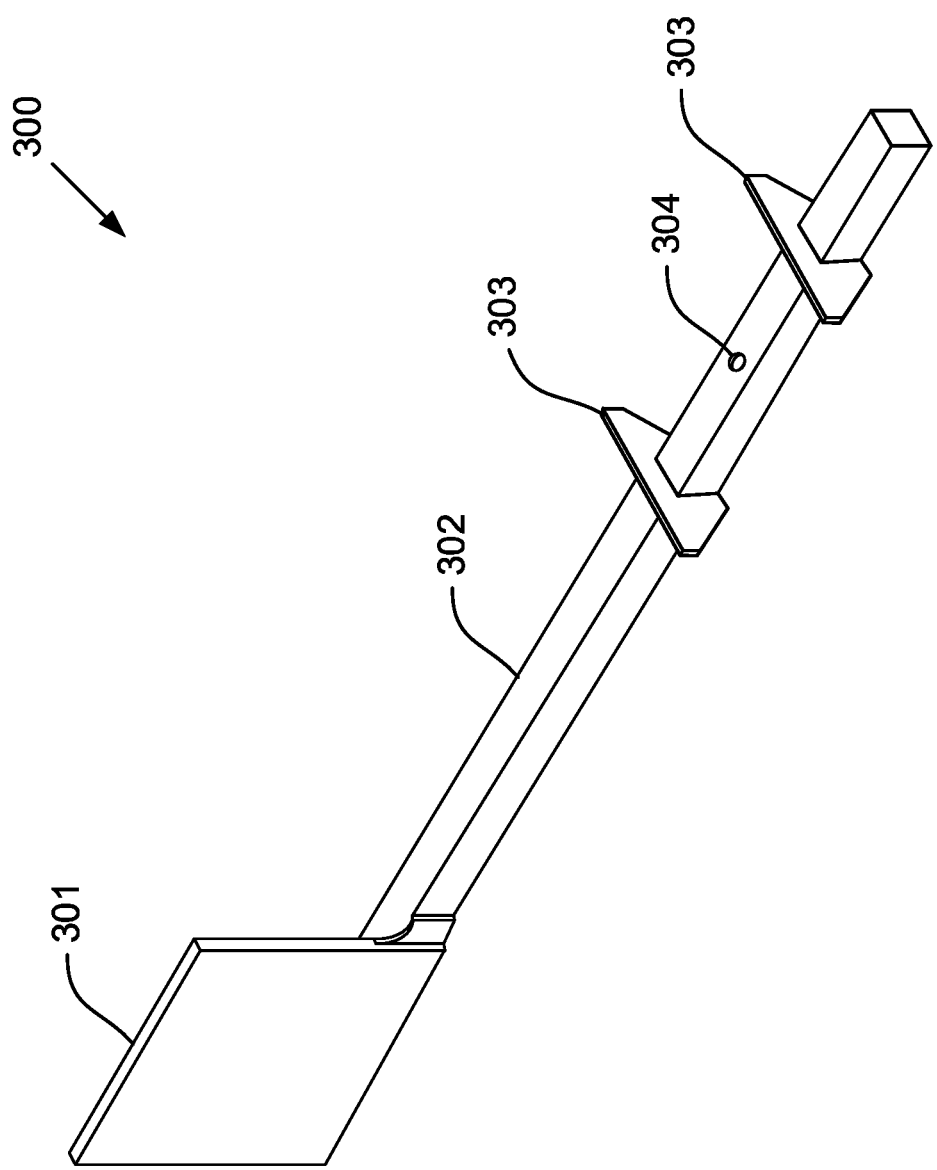
FIG. 3 depicts another embodiment of a target assembly for use with a vehicle alignment rack according to the claimed invention.

FIG. 3 depicts another embodiment of a target assembly for use with a vehicle alignment rack according to the claimed invention. Target assembly 300, similar to target assembly 200 described above, includes target 301, beam 302, mounting tabs 303, and opening 304. However, different from target assembly 200, in embodiments including target assembly 300, each target is coupled to the vehicle frame independently of each other. Thus, in embodiments including target assembly 300, the vehicle frame includes at least four alignment slots in which mounting tabs 303 are positioned to align target assembly 300 with the vehicle frame. Target assembly 300 is secured to the vehicle frame by a threaded bolt passing through opening 304 and into a corresponding threaded opening in the vehicle frame.

Figure 4:
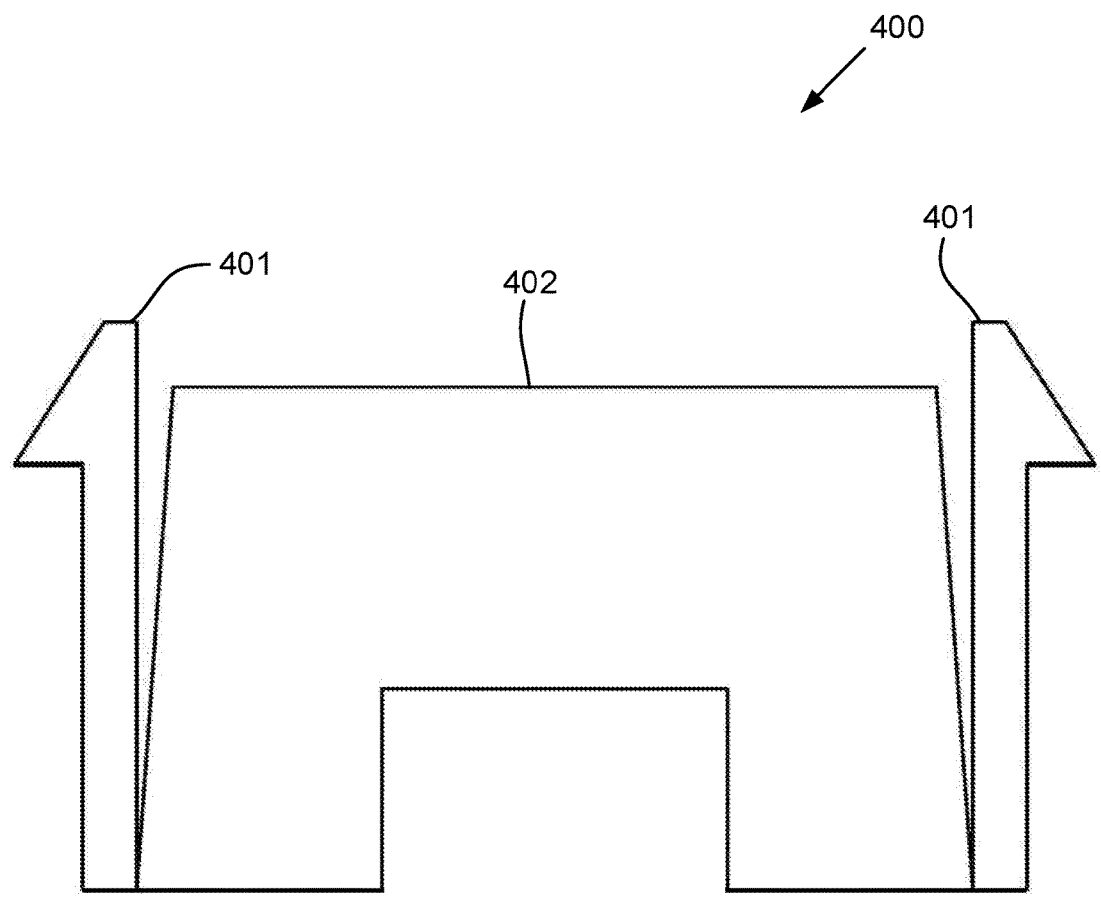
FIG. 4 depicts one embodiment of a mounting tab similar to those described above with regard to FIGS. 2 and 3.

FIG. 4 depicts one embodiment of a mounting tab similar to those described above with regard to FIGS. 2 and 3. Mounting tab 400 includes deflectable latches 401 and alignment tab 402. Deflectable latches 401 catch on to an inside surface of a slot in the vehicle frame corresponding to mounting tab 400. In some embodiments, the inside surface is recessed into the slot such that the depth of the slot is less than the depth of the vehicle frame, and the sum of the depth of the slot and the recess is equal to the depth of the vehicle frame. A similar arrangement is described in more detail below regarding FIG. 4. Alignment tab 402, as with those tabs described regarding FIGS. 2 and 3, ensures proper alignment of mounting tab 400 and the beam it mounts to the vehicle with the vehicle frame.

Figure 5A:
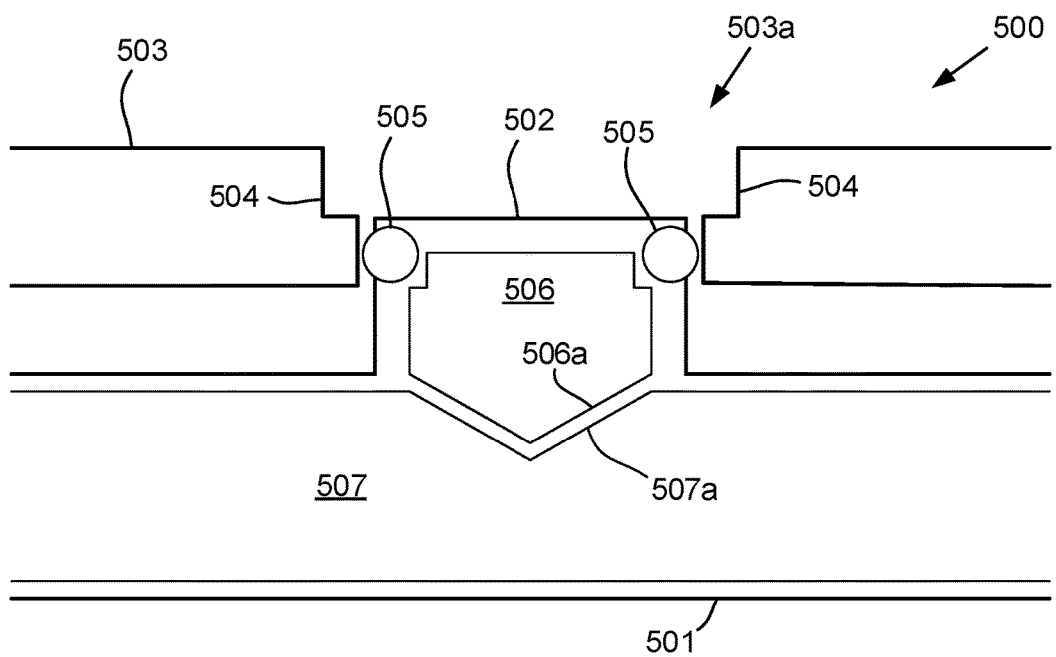
FIGS. 5 A-B depict another embodiment of a mounting tab similar to those described above with regard to FIGS. 2-4.
Figure 5B:
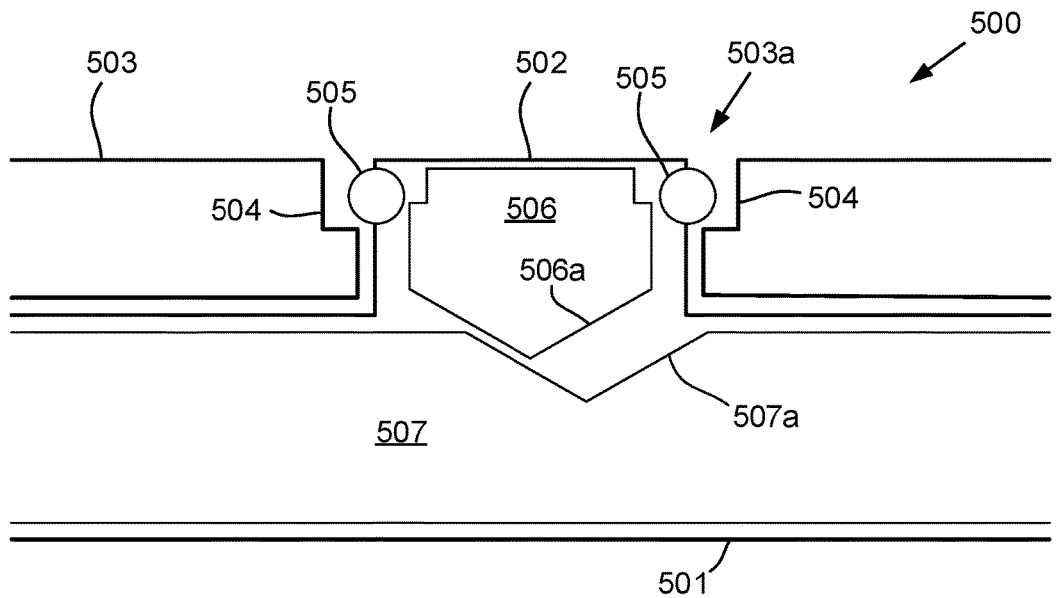

FIGS. 5 A-B depict another embodiment of a mounting tab similar to those described above with regard to FIGS. 2-4. Beam mounting assembly 500 includes beam 501 mounting tab 502, and frame 503. Frame 503 includes insight recess 504. Mounting tab 502 includes bearings 505 and bearing fixing piece 506. Beam 501 includes fixing piece articulator 507. Fixing piece 506 includes protrusion 506a that corresponds to recess 507a in fixing piece articulator 507. Fixing piece articulator 507 is spring-loaded such that fixing piece 506 forces bearings 505 to protrude from mounting tab 502 in a static state. Conversely, as a user applies a force to the spring, compressing and/or extending the spring, fixing piece 506 moves to allow bearings 505 to retract into mounting tab 502. As shown in FIG. 5A, as protrusion 506a is aligned with recess 507a, bearings 505 are free to retract into mounting tab 502, allowing mounting tab 502 to move freely in and out of opening 503a in frame 503. Mounting tab 502 extends perpendicularly from beam 501. Bearings 505 protrude from mounting tab 502 and catch onto recess 504 as mounting tab 502 is inserted into opening 503a.

In the depicted embodiment, beam 501 is at least partially hollowed out to accommodate fixing piece articulator 507 and one or more springs that bias fixing piece articulator 507 such that recess 507a is misaligned with protrusion 506a. Though not depicted, beam 501 also includes, in many embodiments, one or more sliding buttons that allow a user to move articulator 507 against the spring bias and align recess 507a with protrusion 506a. Alternatively, in some embodiments, a screw-drive motor moves articulator 507 against the spring bias upon receiving a signal from a user, such as by a user pressing a button on a graphical user interface of a device having a software application that controls the motor.

Mounting tab 502 is implemented in a variety of ways, and takes a variety of forms in various embodiments. For example, in one embodiment, mounting tab 502 is a cylindrical rod extending from beam 501. In such embodiments, opening 503a is circular. Additionally, in some such embodiments, mounting tab 502 includes a plurality of bearings 505 around the rods circumference. Alternatively, in some embodiments, mounting tab 502 is elongated and/or rectangular similar to those mounting tabs described above with regard to FIGS. 2-4. In some such embodiments, a plurality of bearings 505 are disposed along either side of mounting tab 502.

As shown, mounting tab 502 is hollow to accommodate for bearings 505 and bearing fixing piece 506. However, in some embodiments, mounting tab 502 is solid, and simply includes bores in which bearings 505 and springs corresponding to bearings 505 are disposed. In such embodiments, the springs bias bearings 505 outwards such that bearings 505 catch on recess 504.

In the depicted embodiment, frame 503 includes recess 504 to provide a surface on which bearings 505 catch and support beam 501 without requiring above frame 503 inside the vehicle to accommodate mounting tab 502. However, in some embodiments, recess 504 is not necessary because sufficient space is provided between an inside surface of frame 503 and internal components of the vehicle to accommodate mounting tab 502. In such embodiments, bearings 505 catch on the inside surface 503a.

Various embodiments of fixing piece 506 and fixing piece articulator 507 include a variety of shapes and materials. For example, in some embodiments, beam 501 and mounting tab 502 are comprised of aluminum, fixing piece articulator 507 is composed of plastic, and fixing piece 506 is composed of Teflon. Alternatively, in some embodiments, fixing piece articulator 507 and fixing piece 506 are each composed of metal, and a lubricant is disposed between articulator 507 and fixing piece 506. In general, fixing piece articulator 507 slides back and forth with respect to fixing piece 506. As articulator 507 slides back and forth, protrusion 506a and recess 507a are alternately aligned and misaligned. Though protrusion 506a and recess 507a are depicted as being triangular, various other embodiments also include a variety of similarly complementary shapes. Importantly, as recess 507a moves back and forth with respect to protrusion 506a, fixing piece 506 moves up and down with respect to fixing piece articulator 507.

Figure 6:
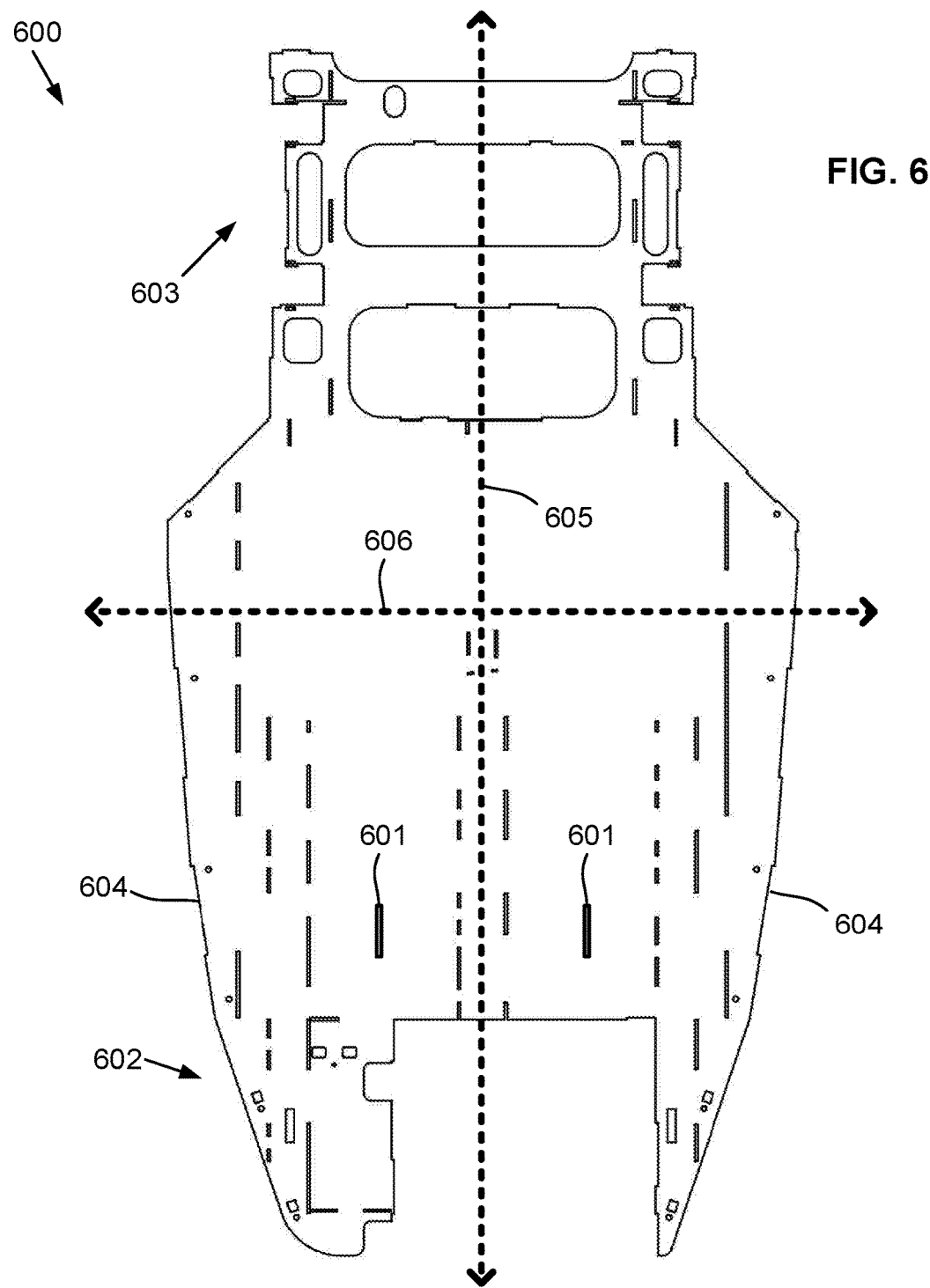
FIG. 6 depicts a bottom view of one embodiment of a vehicle frame to which alignment targets according to the claimed invention are, in some embodiments, mounted.

FIG. 6 depicts a bottom view of one embodiment of a vehicle frame to which alignment targets according to the claimed invention are, in some embodiments, mounted. Vehicle frame 600 includes beam mounting slots 601. As shown, slots 601 are disposed towards aft portion 602 of frame 600. Alternatively, in some embodiments, slots 601 are disposed towards forward portion 603 of frame 600. In yet other embodiments, slots 601 are disposed at a position equidistant from forward portion 603 and aft portion 602. Additionally, as shown, slots 601 are each disposed equidistant from outside edges 604. However, this is not necessary in all embodiments. In some embodiments, only a single slot 601 is included.

In various embodiments, slots 601 are aligned at a known angle with lengthwise axis 605. Lengthwise axis 605 is oriented along frame 600 and with respect to widthwise axis 606 according to a center of gravity of frame 600. Accordingly, lengthwise axis 605 is oriented with respect to widthwise axis 606 such that a force on frame 600 forward or aft of axis 606 along the axis 605 would cause a rotation of frame 600 about axis 606. Similarly, lengthwise axis 605 is oriented with respect to widthwise axis 606 such that a force on frame 600 to one side or the other of axis 605 along the axis 606 would cause a rotation of frame 600 about axis 605.

In the depicted embodiment slots 601 are aligned parallel to axis 605 and perpendicular to axis 606. However, this is not necessary in all embodiments. Rather, it is simply required that the angle between the targets and axis 605 and/or axis 606 is known such that a user can align the vehicle wheels squarely with axes 605 and/or 606.

Figure 7A:
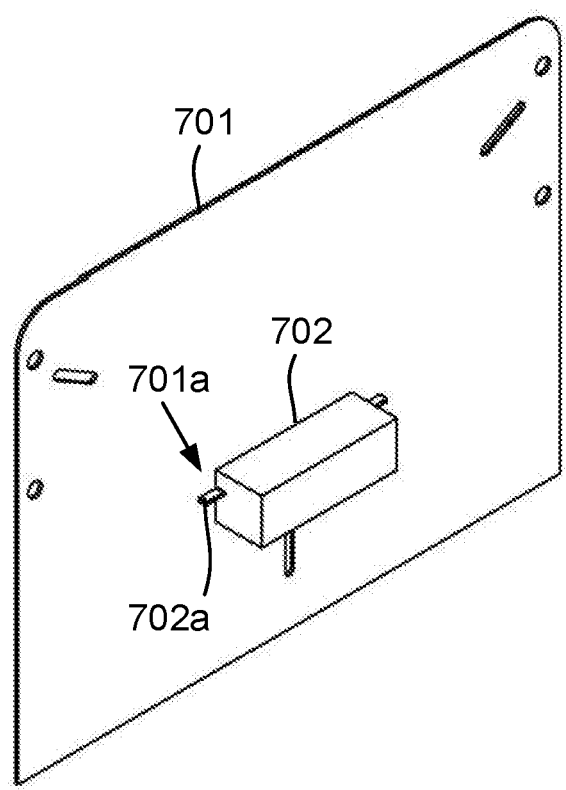
FIGS. 7 A-C depict various views of one embodiment of a laser and a mounting plate according to the claimed invention.
Figure 7B:
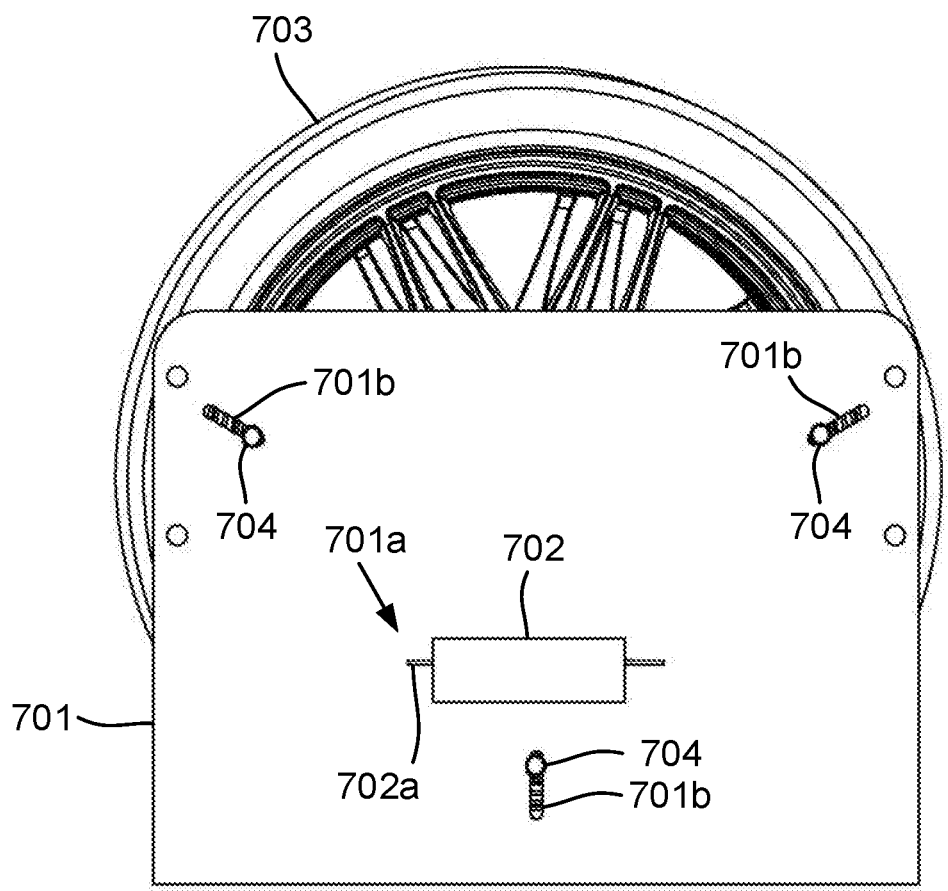
Figure 7C:
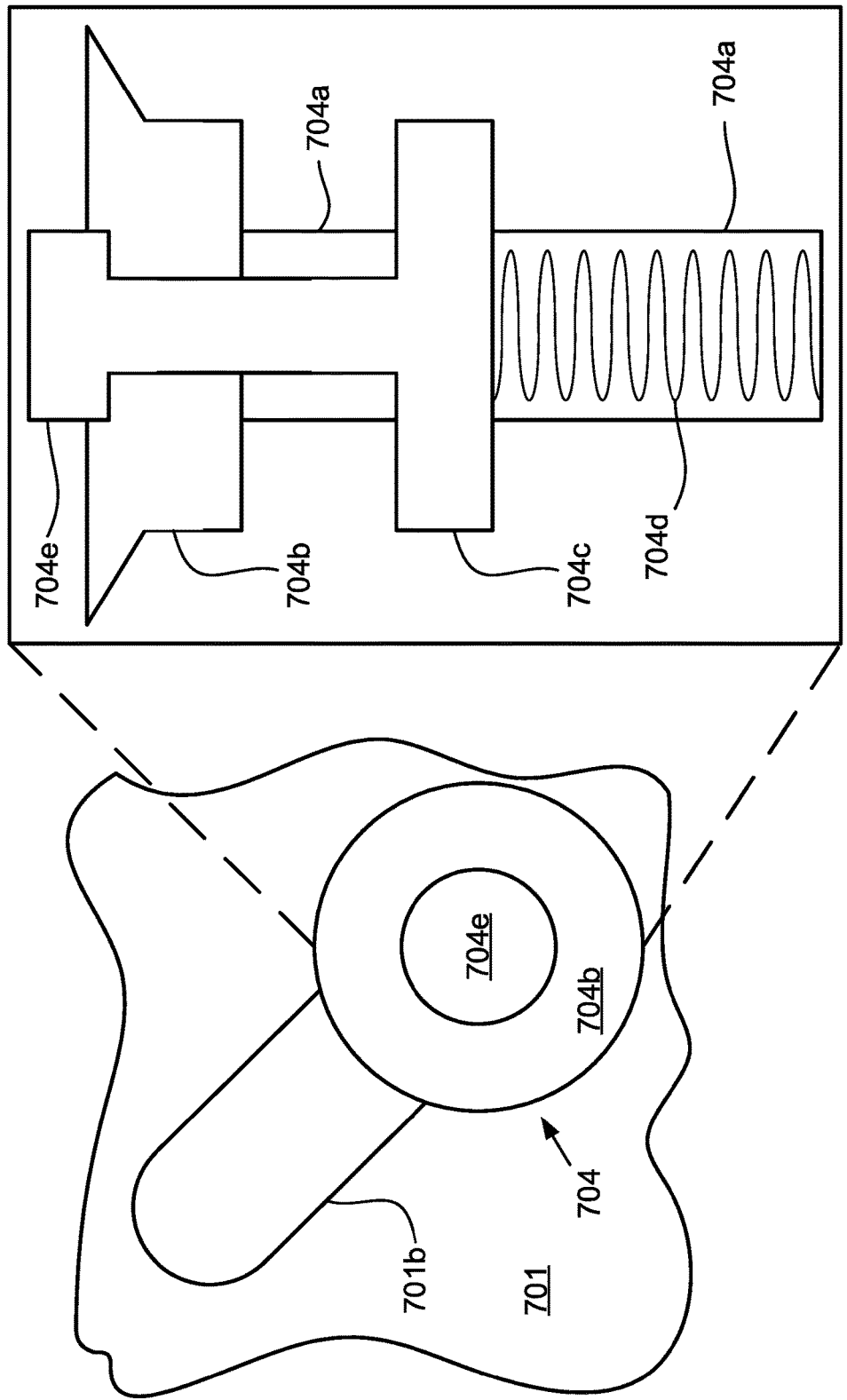

FIGS. 7 A-C depict various views of one embodiment of a laser and a mounting plate according to the claimed invention. FIG. 7A depicts mounting plate 701 and laser 702. FIG. 7B depicts mounting plate 701 coupled to vehicle wheel 703. FIG. 7C depicts one embodiment of a means for coupling mounting plate 701 to wheel 703. In the depicted embodiments, laser 702 is coupled to plate 701 such that laser 702 is offset beneath a vertical center of wheel 703, and is centered relative to a horizontal center of wheel 703. This particular embodiment is complementary with embodiments where the targets are mounted to the undercarriage of the vehicle, such as is depicted in FIGS. 1 A-D. However, as one of skill in the art will appreciate, the position of laser 702 with respect to wheel 703 varies according to the mounting position of the corresponding target.

As shown in FIG. 7A, in some embodiments, mounting plate 701 includes laser mounting slot 701a, and laser 702 includes tab 702a corresponding to laser mounting slot 701a. Tab 702a inserts into slot 701a and mounts laser 702 to plate 701. In other embodiments, tab 702a is directly and fixedly coupled to plate 701, and laser 702 rests on tab 702a. In some embodiments, laser 702 is magnetically mounted to plate 701. Generally, laser 702 mounts in any of a variety of ways to plate 701.

As shown in FIG. 7B, mounting plate 701 includes three wheel mounting slots 701b. Each slot 701b has a longer length than width, with the length of each slot 701B aligned radially on plate 701 such that each slot 701b is disposed in a separate third of plate 701. Each slot 701b corresponds to an inside edge of wheel 703. Rods passing through each slot 701b press against the inside edges of wheel 703 and hold to plate 701, thereby securing plate 701 to wheel 703. FIG. 7C depicts one embodiment of such rods. Rods 704 includes shaft 704a, outside flange 704b and wheel side flange 704c. Shaft 704a passes through slot 701b and presses against wheel 703. Flange 704c is spring-loaded by spring 704d disposed in shaft 704a, securing plate 701 between outside flange 704b and wheel side flange 704c. A user releases rods 704 from plate 701 by pressing the button 704e.

Figure 8A:
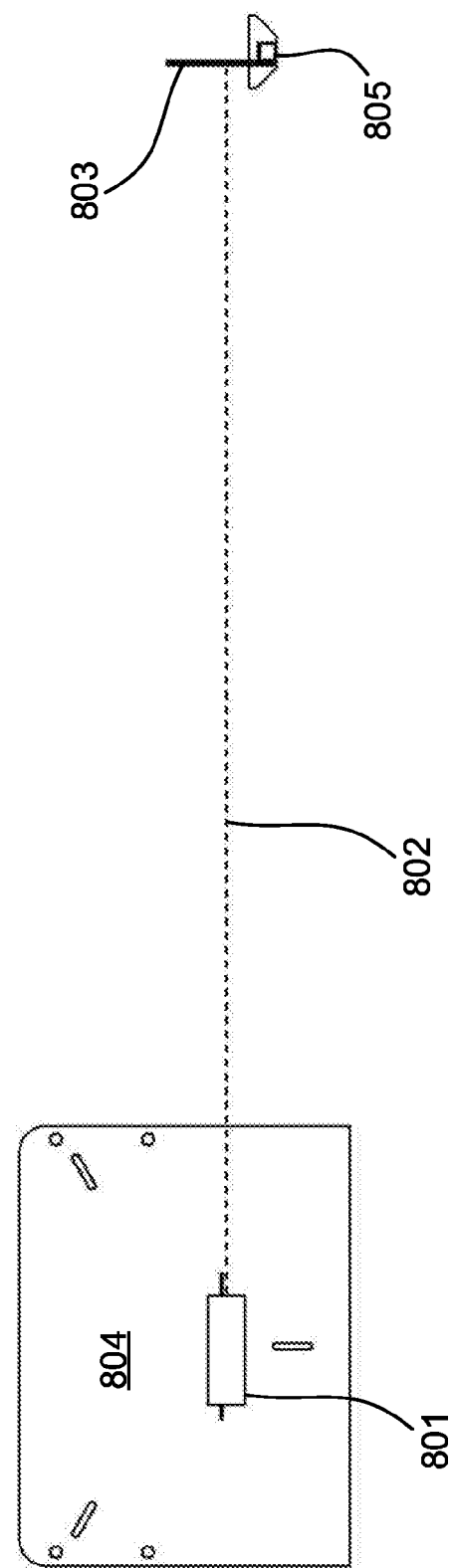
FIGS. 8 A-C depict various steps in a process for aligning a vehicle wheel to the vehicle's frame using an apparatus according to the claimed invention.
Figure 8B:
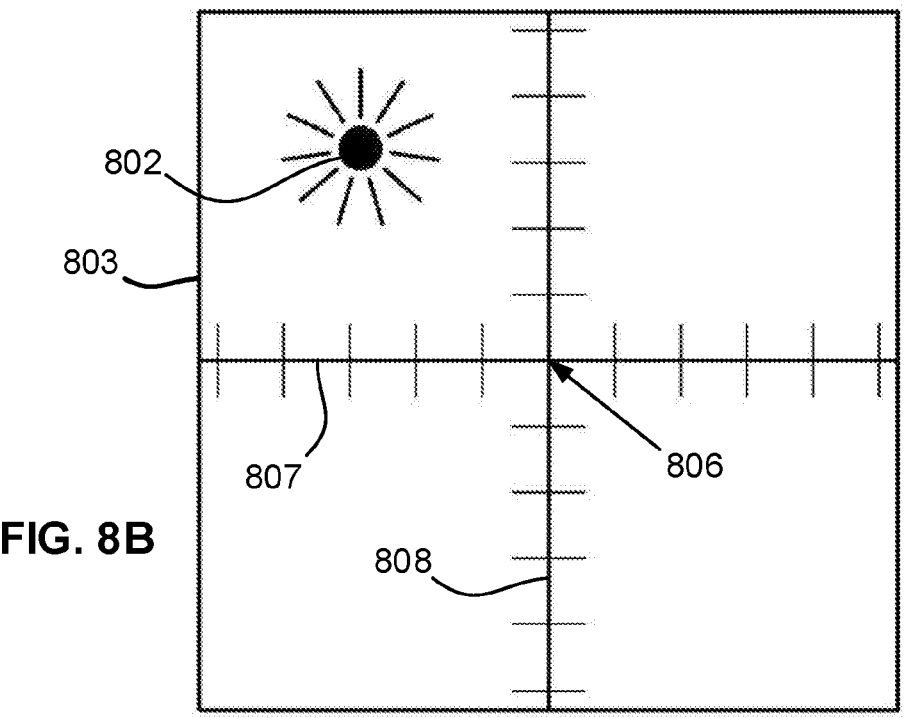
Figure 8C:
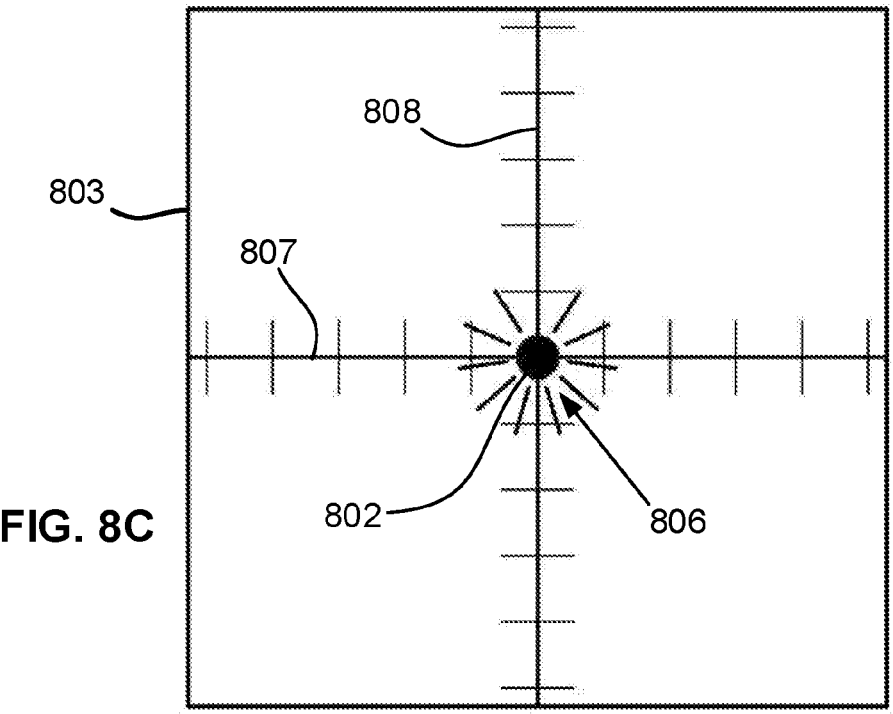

FIGS. 8 A-C depict various steps in a process for aligning a vehicle wheel to the vehicle's frame using an apparatus according to the claimed invention. As shown in FIG. 8A, laser 801 emits light beam 802, which strikes target 803. Laser 801 is coupled, via plate 804, to the vehicle's wheel, and target 803 is coupled by beam 805 to the vehicle's frame. As shown in FIGS. 8 B-C, target 803 indicates to a user where light beam 802 should strike target 803 when the wheel is properly aligned to the frame. Position 806 on target 803 indicates proper alignment of the wheel to the frame. As light beam 802 strikes target 803 at position 806, target 803 indicates proper alignment to the user. Toe axis 807 indicates the toe of the wheel to the user. Similarly, camber axis 808 indicates the camber of the wheel to the user, provided that laser 801 is positioned above or below the vertical center of the wheel. The further laser 801 is positioned from the vertical center of the wheel, the more sensitive the camber measurement of the alignment rack is.

Figure 9A:
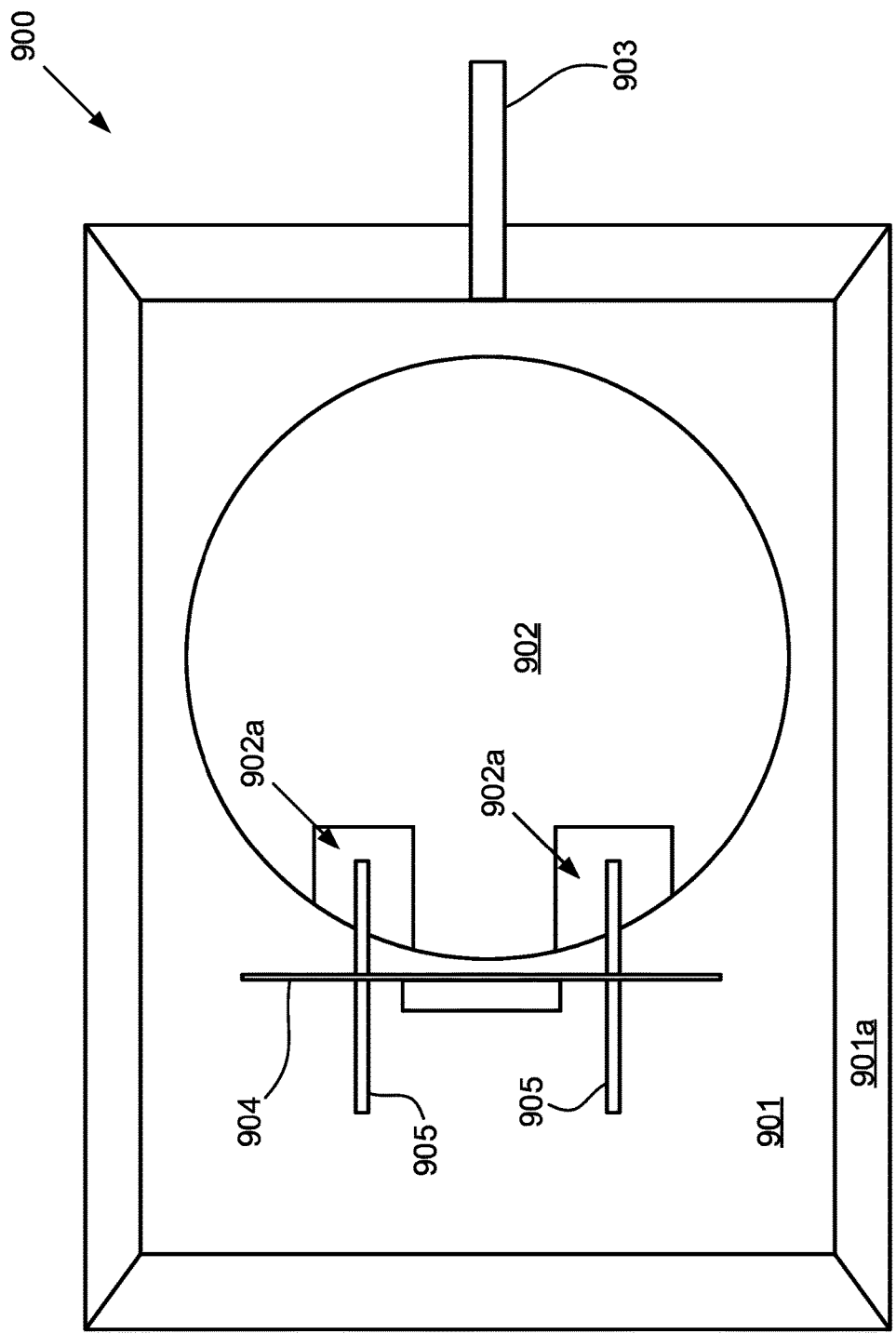
FIGS. 9 A-B depicts a top view of one embodiment of a rotating wheelbase for use with an alignment rack according to the claimed invention.
Figure 9B:
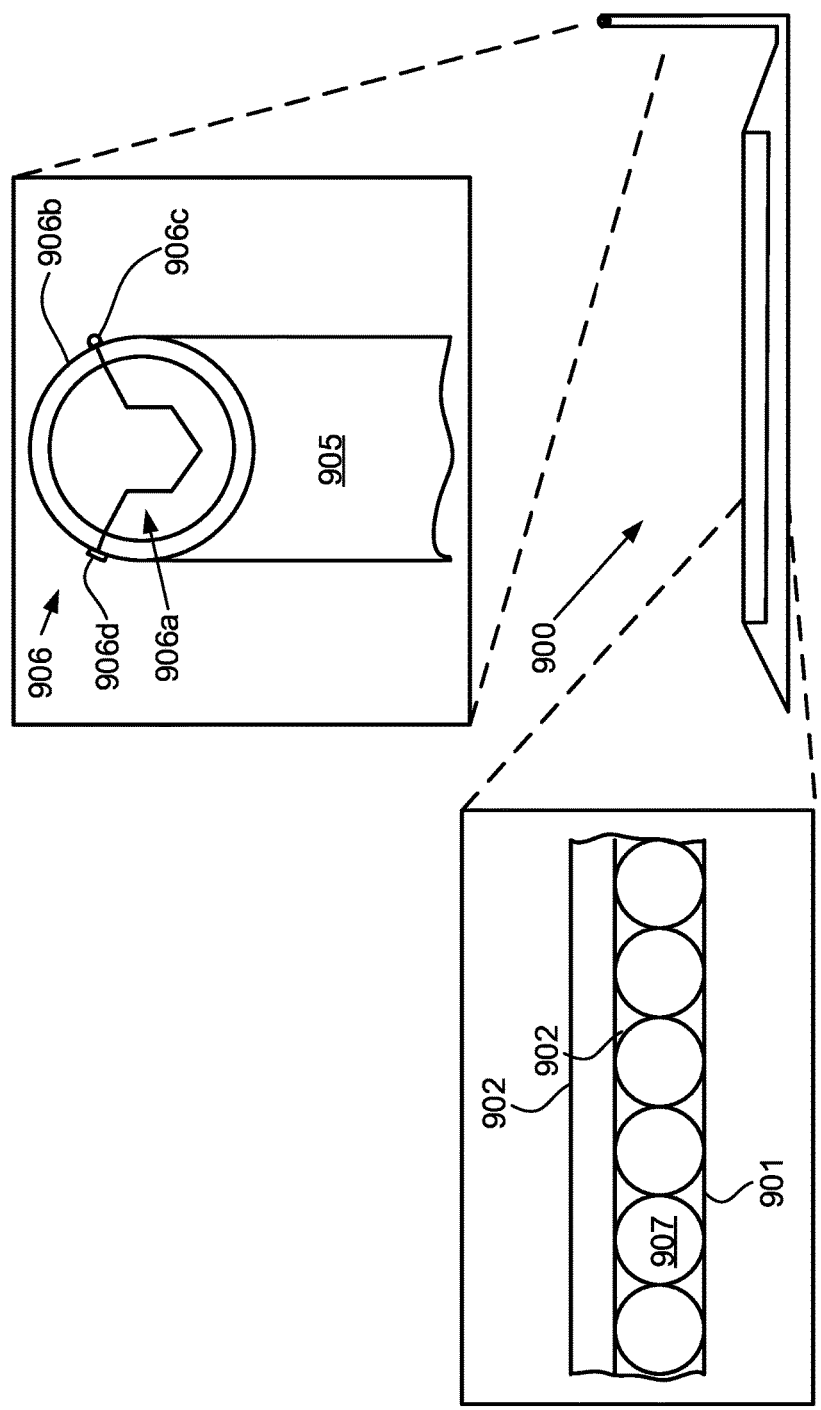

FIGS. 9 A-B depict a top view of one embodiment of a rotating wheelbase for use with an alignment rack according to the claimed invention. Rotating base 900 includes fixed support structure 901, rotatable wheel interface 902, ratchet arm 903, laser mounting plate 904, and mounting plate slots 905. Base 900 is disposed beneath the wheel as the wheel is aligned to the vehicle frame, and includes, in some embodiments, bevel 901a that allows the vehicle to be smoothly driven onto base 900. Fixed support structure 901 is fixed with respect to, for example, the ground, and rotatable wheel interface 902 is rotatable relative to fixed support structure 901. This allows wheel interface 902 to rotate with the wheel relative to support structure 901 as the wheel's toe is adjusted. Indeed, one benefit of base 900 is that the user can adjust the wheel's toe without having to lift the wheel off the ground, and/or have the wheel be free hanging. This reduces the amount of time required to adjust the wheel's toe. Ratchet arm 903 fixedly couples an automated ratchet to support structure 901 to provide a counterforce to the automated ratchet as the ratchet adjusts the toe of the wheel. One embodiment of such an automated ratchet is depicted in more detail in FIG. 9B. The combination of rotatable wheel interface 902 and the automated ratchet allows the user to adjust the vehicles toe without having to lift the vehicle off the ground.

Mounting plate 904 is slidably mounted to support structure 901 in mounting plate slots 905. In some embodiments, such as the depicted embodiment, wheel interface 902 includes recesses 902a around slots 905 to allow mounting plate 904 to be positioned at least partially over wheel interface 902 while still allowing wheel interface 902 to rotate with respect to support structure 901. This provides a user with greater flexibility in positioning the wheel on wheel interface 902 while still allowing mounting plate 904 to contact the wheel at forward and aft positions. Otherwise, the user would have to position the wheel right at the outside circumference of wheel interface 902 in order to ensure proper alignment of mounting plate 904 with the wheel.

FIG. 9B depicts a side view of rotating base 900, including callouts depicting ratchet head 906 and bearings 907. Ratchet head 906 couples to a tie rod corresponding to the vehicle wheel being aligned, and includes tie rod interface 906a, articulating clasp 906b, joint 906c, latch 906d. The user couples ratchet head 906 to the tie rod by opening articulating clasp 906b, which rotates about joint 906c. In some embodiments, ratchet arm 905 is extendable, allowing the user to adjust the height of ratchet head 906 according to the position of the tie rod. Once tie rod interface 906a, which has an internal shape corresponding to an external shape of the tie rod, is interfaced with the tie rod, clasp 906b is closed around the tie rod and secured closed by latch 906d. Tie rod interface 906a rotates in ratchet head 906 by a driving mechanism, such as an electric or pneumatic hammer and anvil mechanism, rotating the tie rod to adjust the wheel's toe. Bearings 907 are disposed between wheel interface 902 and support structure 901, and allow wheel interface 902 to rotate with respect to support structure 901.

Figure 10:
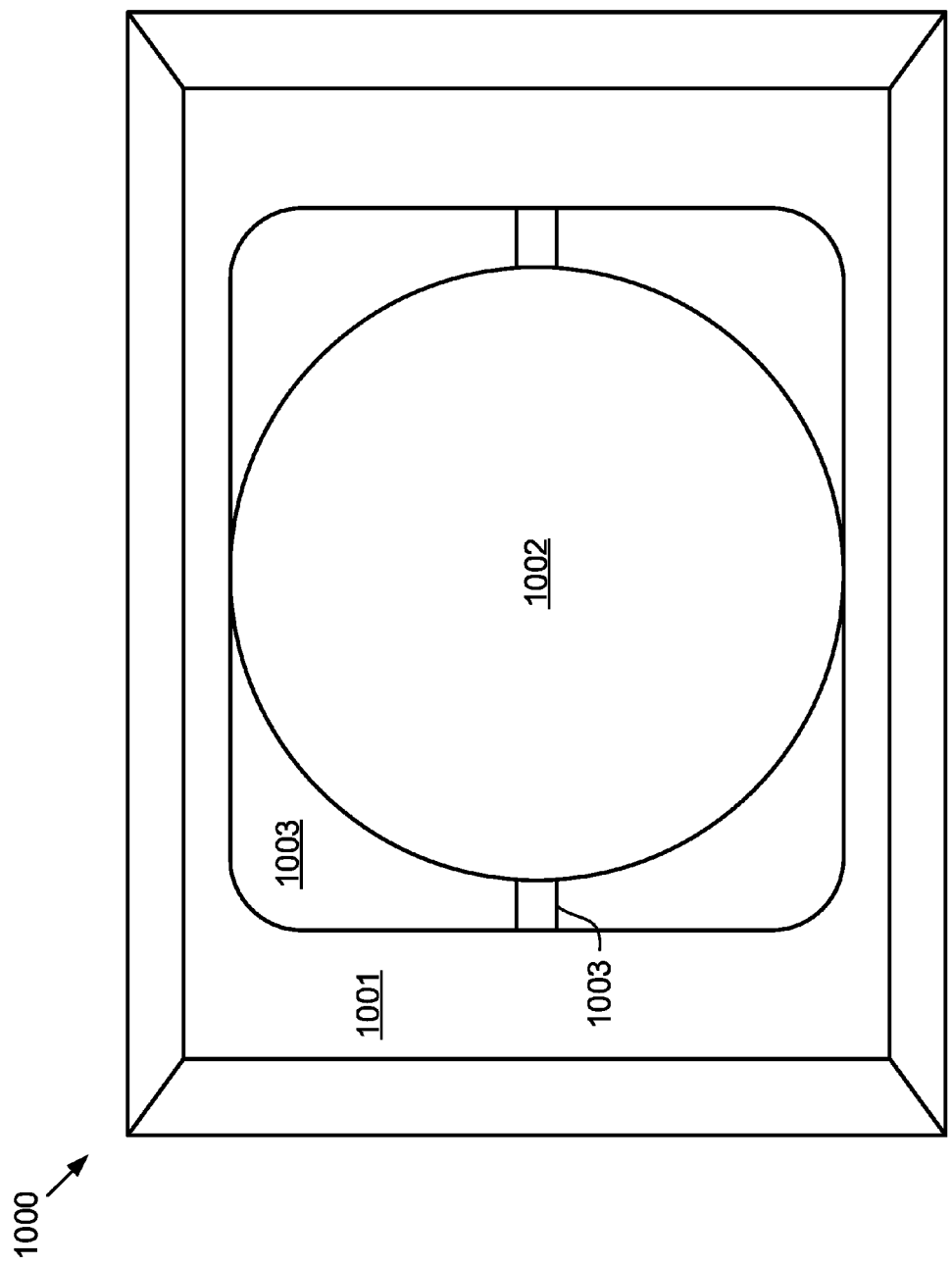
FIG. 10 depicts another embodiment of a wheelbase for use with an alignment rack according to the claimed invention.

FIG. 10 depicts another embodiment of a wheelbase for use with an alignment rack according to the claimed invention. Wheelbase 1000, similar to base 900, includes fixed support structure 1001 and rotatable wheel interface 1002. However, wheelbase 1000 also includes one or more slots 1003. Wheel interface 1002 slides from one side of base 1000 to the other side of base 1000 in slot 1003 as the wheel's camber is adjusted. Such an embodiment allows for adjustment of the wheel's toe and camber without having to lift the vehicle off the ground.

Figure 11:
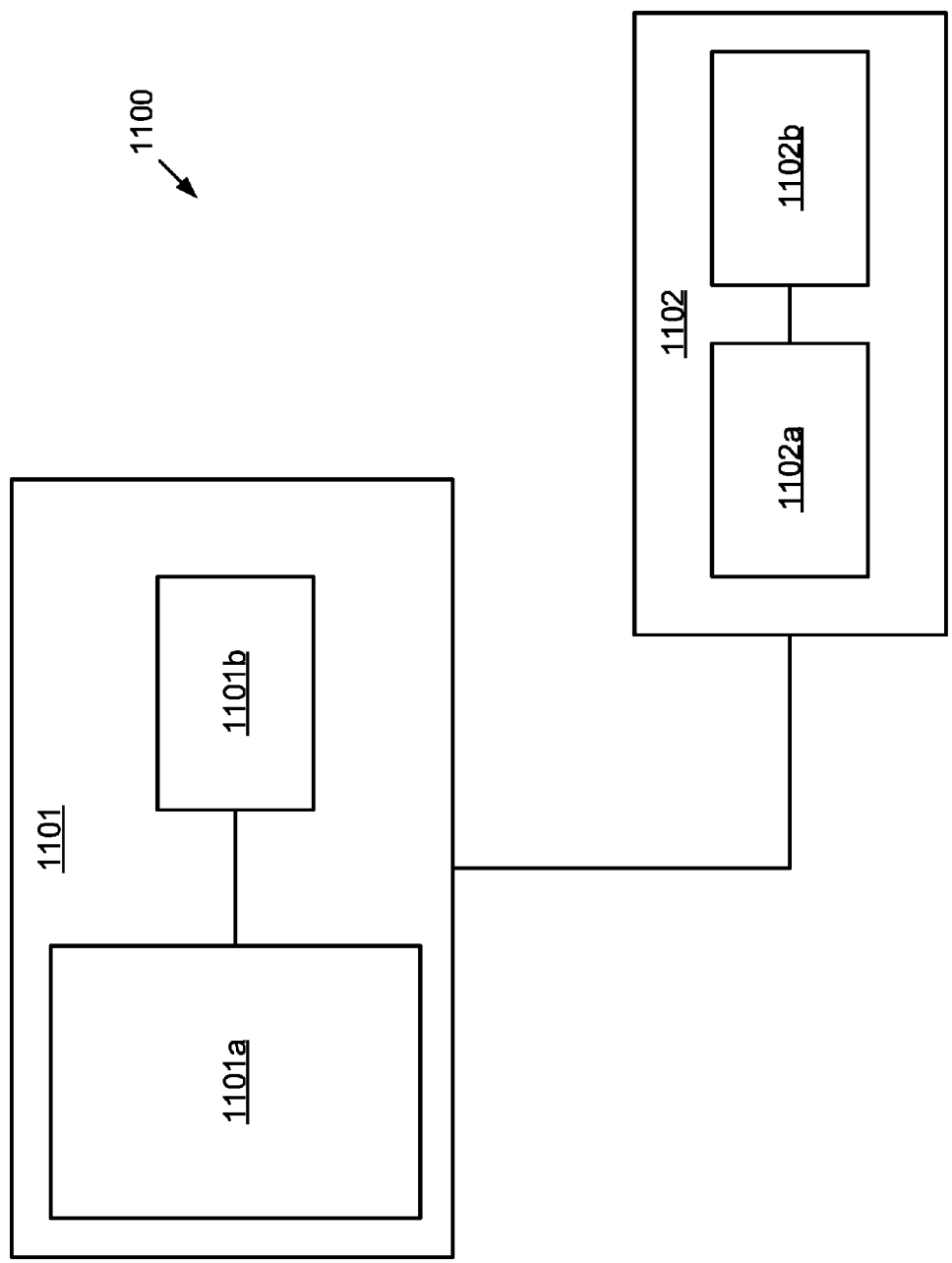
FIG. 11 depicts an example diagram of an automated wheel toe adjusting system according to the claimed invention.

FIG. 11 depicts an example diagram of an automated wheel toe adjusting system according to the claimed invention. System 1100 includes photosensitive target 1101 and automated ratchet 1102. As described previously, in some embodiments of the alignment rack described herein, the target includes a photosensitive surface that detects where on the target a beam emitted by a laser (corresponding to a wheel being aligned and the target) strikes the target. Thus, target 1101 includes photo sensors 1101a. Photo sensors 1101a send signals to hardware processors and memory 1101b. The memory component of processors and memory 1101b stores the relative position of each photo sensor. The processor component of processors and memory 1101b receives signals from photo sensors 1101a and compares the signals received to the positions stored in the memory. The processors also compare the positions identified in the memory with a desired position indicated by a user and or stored in the memory. Based on a difference between the actual position detected by photo sensors 1101a and the desired positions stored in the memory, the processors send a signal to ratchet 1102 to adjust the toe of the wheel by rotating the tie rod.

Ratchet 1102 includes hardware processors and memory 1102a and driving mechanism 1102b. The processor component of processors and memory 1102a receives instructions from target 1101 to adjust the toe of the wheel. The memory complement component of processors and memory 1102a stores information and or instructions related to which direction to rotate the tie rod based on the difference between the current and desired toe of the wheel. The processor component accesses the memory complement and compares the instructions received to the direction of rotation stored in the memory complement. Then, based on that direction of rotation, the processor component sends instructions to driving mechanism 1102b to rotate the tie rod.

We claim:

1. A vehicle wheel alignment rack system, comprising:
   at least one laser removably attached to a plate mounted against an inside surface of a front wheel rim of a vehicle, the laser disposed along a radius of the front wheel rim; and
   a target directly and removably coupled to a frame of the vehicle at a position intermediate the front wheel and a rear wheel such that the target is aligned with the vehicle frame at a known angle, wherein the front wheel is aligned to the vehicle frame, and wherein the at least one laser illuminates a spot on the target.

2. The system of claim 1, further comprising:
   at least a second laser removably attached to a plate mounted against an inside surface of a second front wheel rim of the vehicle, the laser disposed along a radius of the second front wheel rim, the second front wheel rim disposed at an opposite side of the vehicle from the first front wheel rim; and
   a second target directly and removably coupled to the frame of the vehicle at a position intermediate the front wheel and a rear wheel at an opposite side of the vehicle from the first target such that the second target is aligned with the vehicle frame at a second known angle, wherein
   the second front wheel is aligned to the vehicle frame, and wherein the at least one laser illuminates a location on the target.

3. The system of claim 2, wherein the first and second targets are coupled to each other via a beam that couples the first and second targets to the vehicle frame at a position intermediate the front wheel and a rear wheel, wherein the beam passes beneath the vehicle, behind widthwise axis of the vehicle, in front of the widthwise axis of the vehicle, or along the lengthwise axis of the vehicle.

4. The system of claim 3, wherein the vehicle frame further comprising one or more slots that receive one or more tabs of the beam that mount the beam directly to the frame at a position intermediate the front wheel and a rear wheel.

5. The system of claim 4, wherein the one or more tabs include one or more deflectable latches that catch onto an inside surface of the frame and secure the beam to the frame at a position intermediate the front wheel and a rear wheel.

6. The system of claim 3, wherein the frame further comprising one or more threaded circular openings that receive one or more threaded bolts that mount the beam directly to the frame at a position intermediate the front wheel and a rear wheel.

7. The system of claim 3, wherein the frame further comprising one or more circular openings, and the beam comprising one or more rods extending perpendicularly from the beam, each rod having a plurality of spring loaded-bearings protruding around a circumference of the one or more rods such that the plurality of spring-loaded bearings catch on an inside surface of the frame as the one or more rods are inserted into the one or more circular openings.

8. The system of claim 2, wherein the first target is coupled to the frame independent ∥ of the second target, and wherein the second target is coupled to the frame independent of the first target at a position intermediate the front wheel and a rear wheel.

9. The system of claim 1, wherein the laser is removably attached to a plate mounted on an inside edge of the front wheel rim, wherein the plate is removably mounted to the inside surface of the front wheel rim such that the plate contacts a forward portion and an aft portion and a lower portion of the inside surface front wheel rim and the laser is radially disposed below a vertical center of the front wheel rim.

10. The system of claim 9, wherein the plate further comprises a laser-mounting slot and the laser comprising a tab, wherein the tab inserts into the laser-mounting slot and mounts the laser to the plate radially below the vertical center of the front wheel rim when the plate is mounted on the tire mounted on the wheel rim.

11. The system of claim 10, wherein the plate further comprises three wheel-mounting slots, each wheel-mounting slot having a longer length than width, the length of each wheel-mounting slot aligned radially on the plate, each wheel-mounting slot disposed in a separate third of the plate, wherein each wheel-mounting slot corresponds to an inside edge of the wheel, the plate further comprising rods in each wheel-mounting slot that press against the inside edges of the wheel and hold to the plate, thereby securing the plate to the wheel.

12. The system of claim 11, wherein each rod comprises:
    a shaft that passes through the wheel-mounting slot and presses against the inside surface of the front wheel rim;
    an outside flange; and
    a wheel-side flange, wherein the wheel-side flange is spring-loaded and secures the plate against the inside surface of the front wheel rim between the outside and wheel-side flanges.

13. The system of claim 9, wherein the wheel comprises one or more outward-facing magnetic surfaces, wherein the plate magnetically mounts to the front wheel.

14. The system of claim 1, wherein the laser is offset beneath a vertical center of the front wheel.

15. The system of claim 1, wherein the laser is centered relative to a horizontal center of front the wheel.

16. The system of claim 1, wherein the target comprises:
    a photosensitive surface facing the laser; and
    one or more hardware processors that receive signals from the photosensitive surface indicating the location on the target where the light beam strikes the target.

17. The system of claim 16, further comprising an automated ratchet coupled to a tie rod, the ratchet comprising:
    a tie rod interface having an internal shape corresponding to an external shape of the tie rod;
    a driving mechanism that rotates the tie rod via the interface; and
    one or more hardware processors that execute instructions to rotate the tie rod based on a comparison between the location on the target where the light beam strikes the target and a desired location on the target indicating a desired toe of the front wheel.

18. The system of claim 17, further comprising a rotating base disposed beneath the front wheel, the base comprising:
    a fixed support structure;
    a rotating front wheel interface; and
    one or more bearings between the support structure and the front wheel interface that allow the front wheel interface to rotate with the front wheel relative to the support structure as the front wheel's toe is adjusted, wherein the ratchet is fixedly coupled to the base.

19. The system of claim 18, wherein the support structure comprises one or more slots, wherein the wheel interface slides from one side to another in the slots as a camber of the front wheel is adjusted.

20. The system of claim 18, further comprising a plate slidably mounted to the base, wherein the laser mounts to the plate, and wherein the plate contacts a forward portion and an aft portion of the front wheel.

* * * * *